(No Model.)
J. F. SCHULTZ.
UTENSIL FOR HOLDING SWEEPINGS.
No. 554,840. Patented Feb. 18, 1896.
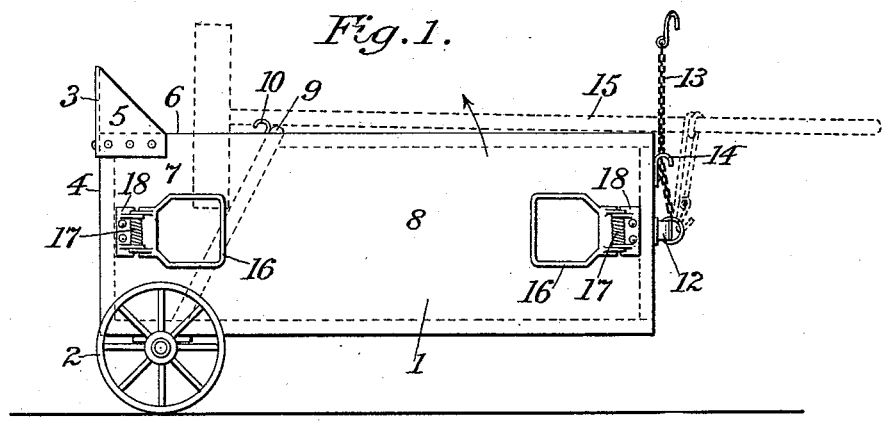
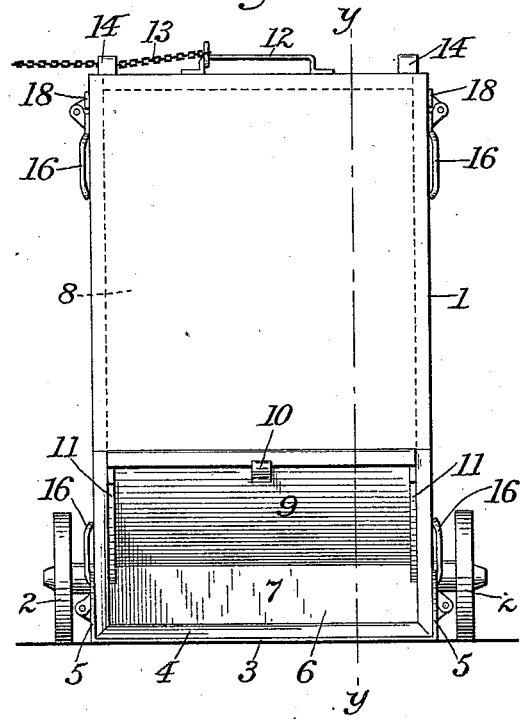
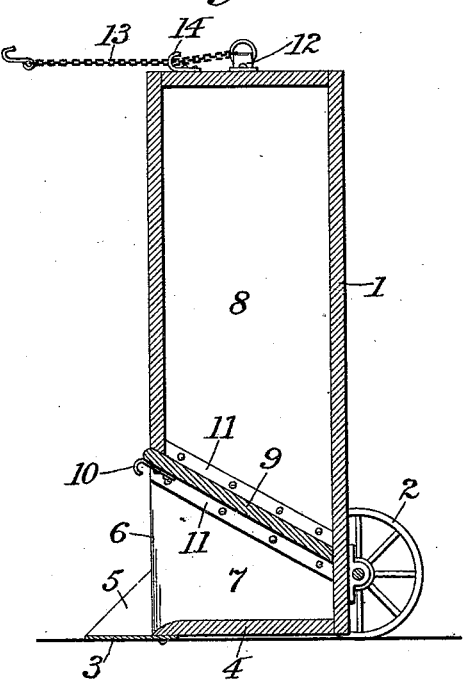
Attest:
A. N. Jesbera.
E. M. Shuster.
Inventor:
John F. Schultz,
by H. G. Rogers
Atty.

UNITED STATES PATENT OFFICE.

JOHN F. SCHULTZ, OF BROOKLYN, NEW YORK.

UTENSIL FOR HOLDING SWEEPINGS.

SPECIFICATION forming part of Letters Patent No. 554,840, dated February 18, 1896.

Application filed May 6, 1895. Serial No. 548,207. (No model.)

*To all whom it may concern:*

Be it known that I, JOHN F. SCHULTZ, a citizen of the United States, and a resident of the city of Brooklyn, in the county of Kings and State of New York, have invented certain new and useful Improvements in Utensils for Holding Sweepings; and I do hereby declare that the following is a full and exact description thereof, reference being had to the accompanying drawings, and to the figures of reference marked thereon, making a part of this specification.

My invention relates to utensils for gathering, holding, and porting sweepings, waste papers, &c., usually found in streets and other localities.

The object of my invention is to provide for single sweepers an easily-portable utensil with which conveniently to gather small heaps of sweepings into large enough heaps for horse-carts, to save much labor in sweeping them together in the customary way, often over clean parts of pavements.

My invention is a rectangular oblong box-receptacle, when standing on end in proper position about the size of a large carpet or hand bag. It can be carried as such. Only about one-third of one side, termed its "front" side, is left open at the bottom. Under the opening is a projecting lip or pan fixed at right angles to the oblong box. Above the opening is a downward-sliding partition-board dividing the box into two compartments, a closed upper one and an open lower one. The box is therefore an original two-story or double-deck sweepings-holder.

In the accompanying drawings, Figure 1 is a side view of the invention. Fig. 2 is a front view of the same. Fig. 3 is a section on the line *y y* of Fig. 2.

The invention is a substantial box 1, made preferably of wood. It may be provided with a pair of small truck-wheels 2, located near the bottom, on which is the projecting lip or pan 3. This lip may be part of the box, the upper front sides being cut off enough to leave lips with upward-slanting sides. The lip is, however, made preferably of thin metal, its sides turned up to form sides 5 to guide the sweepings into the opening 6. Between the lower open space, 7, and the upper inner space, 8, of the box is the sliding partition-board 9, provided with a catch or strap 10. The partition-board slides in guide-strips 11. On the top end of the box is handle 12 for carrying the box about and to hold chain 13, ending in a hook.

To truck the box, it must be tilted on its back, the chain being passed under catch 14. The operator alongside the box then lifts its top end by the chain off the ground and trucks it full of sweepings easily along to form large heaps. Truck-wheels for the top end are thus dispensed with. The chain 13 also serves to hold the broom 15 in position, as shown by dotted lines in Fig. 1. The broom-handle can then serve as a pole or shaft of the box to push or pull it long distances. For carrying salable waste paper frames 16, preferably made of bent wire, are provided. They are actuated by common spring-hinges 17, whose rigid plates 18 are screwed on the box.

Further operations of my invention are as follows: Street-sweepers keep the box generally on the edge of sidewalks, out of the way of teams, till they have swept together small heaps in different places. To gather them, they place the box in position, fronting a heap, and with the broom push or sweep the heap on the lip and into the open compartment. When that is filled the sweeper tips the box on its back, withdraws the partition-board, and stands the box on its upper or handle end to make its contents fall to that end. The partition-board must then be replaced and the box turned back to its original proper standing position, with its lower, then again empty, compartment on the ground.

If desired, the whole or part of the top of the box and also the whole front of the same above the opening may be hinged doors or lids, fastened with common spring-holds. Instead of the upright standing grip or handle shown in drawings an ordinary bucket-handle of bent wire may be fastened to the sides of the box. The top of it then furnishes a seat for the house or store keeper who owns it to hold sidewalk-sweepings, &c.

What I claim as new, and desire to secure by Letters Patent, is—

1. The sweepings-holder comprising an oblong box having a lip projecting therefrom on a line with its lower end, when the box is placed in its upright position, and a sliding partition dividing the box into two compartments substantially as specified.

2. A sweepings-holder comprising an oblong box provided with a lip projecting therefrom, a sliding partition, truck-wheels, a handle and chain, substantially as specified.

3. A sweepings-holder, comprising an oblong box and spring-actuated frames substantially as specified.

In testimony whereof I have signed my name to this specification in the presence of two subscribing witnesses.

JOHN F. SCHULTZ.

Witnesses:
A. N. JESBERA,
E. M. SHUSTER.